June 11, 1968     W. L. PIERCE     3,387,854
TWO-WHEEL TRAILER
Filed May 9, 1966                                          2 Sheets-Sheet 1
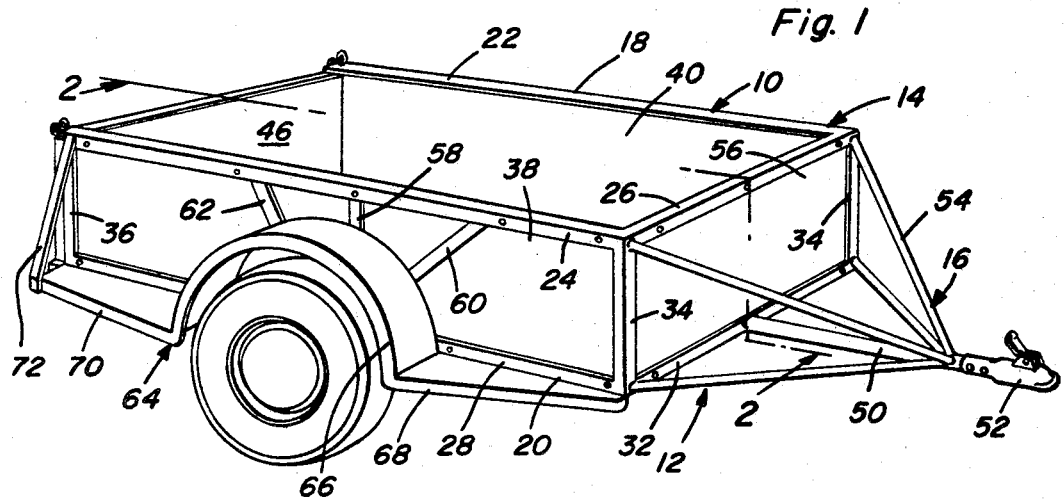
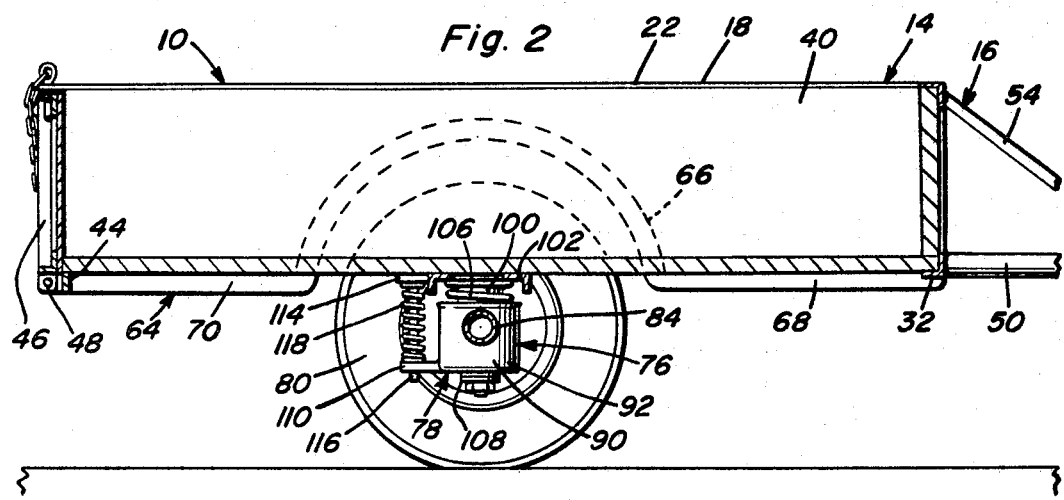
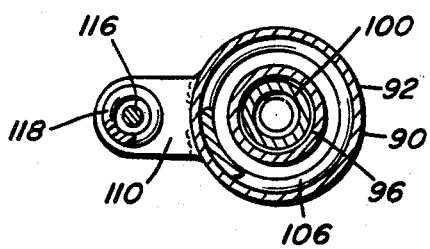
William L. Pierce
INVENTOR.
BY June 11, 1968  W. L. PIERCE  3,387,854
TWO-WHEEL TRAILER Filed May 9, 1966  2 Sheets-Sheet 2

William L. Pierce
INVENTOR.

BY
Attorneys

United States Patent Office 3,387,854
Patented June 11, 1968

3,387,854
TWO-WHEEL TRAILER
William L. Pierce, P.O. Box 393,
Belle Glade, Fla. 33430
Filed May 9, 1966, Ser. No. 548,496
7 Claims. (Cl. 280—69)

ABSTRACT OF THE DISCLOSURE

A trailer provided with an axle suspension system including telescopingly engaged guide members secured at remote ends to the chassis and axle of the trailer and abutments mounted to one side of the axle, carried by the guide members and having spring means disposed therebetween yieldingly urging said abutments apart so as to tend to roll the axle about its center axis and thereby cause the telescoped guide members to be canted slightly relative to each other and to bind slightly on each other in a shock dampening manner, the trailer further including a transverse front wall defining opposite side upper and lower corner portions and a forwardly projecting tongue assembly including upper and lower pairs of opposite side forwardly converging bracing bars secured at their rear ends to corresponding corner portions of the front wall and to each other at their forward ends.

---

This invention relates to a novel and useful two-wheel trailer and more specifically to a trailer including novel framework including a forwardly projecting tongue adapted for securement to a draft vehicle and novel running gear including a transverse rigid axle member supported from the frame of the trailer for independent movement of the opposite ends of the axle member toward and away from the frame.

The two-wheeled trailer of the instant invention has been designed for simplicity of construction and in a manner enabling the trailer to be produced at a minimum of cost. Further, the trailer additionally includes vertically spaced upper and lower peripheral frame sections rigidly interconnected by means of suitable corner vertical members and is provided with a towing tongue including rigid connections with the forward transverse members of each of the upper and lower peripheral frame sections. In this manner, vertical thrusts applied to the forward end of the tongue due to up and down movement of that portion of the towing vehicle to which the trailer tongue is secured are more evenly distributed to the frame assembly of the trailer and therefore to the load supported thereby.

The above referred to even distribution of vertical thrusts applied to the forward end of the trailer tongue also applies to the distribution of lateral thrusts applied to the forward end of the trailer tongue and therefore the trailer of the instant invention inherently has better tracking qualities and is less likely to have portions thereof or heavy loads supported thereby oscillate either in a vertical plane or in a horizontal plane relative to a portion of the trailer tongue attached to the towing vehicle.

In some trailers an attempt is made to provide a lightweight trailer capable of supporting reasonable loads but most of these attempts result in the provision of a trailer whose frame and/or load bed may "work" relative to the portion of its trailer tongue secured to a towing vehicle in an oscillatory manner. This uncontrolled oscillation of any portion of a load supported from the trailer can be greatly magnified by slight yawing movements of the towing vehicle while moving through traffic or over rough roads. When such magnification occurs reasonable control over the trailer by the driver of the towing vehicle is not provided and the trailer can often times in turn begin to control, to a great degree, lateral movement of the rear end of the towing vehicle.

Accordingly, it is a main object of this invention to provide a relatively lightweight trailer including vertically spaced rigidly interconnected frame sections and a towing tongue rigidly connected to both vertically spaced frame sections in a manner such that both lateral and vertical thrusts applied to the forward end of the towing tongue will be evenly distributed to the trailer throughout its frame and body and therefore also the load carried by the trailer.

Another important object of this invention to be specifically enumerated herein is to provide a trailer in accordance with the preceding object and including novel running gear particularly well adapted for use in combination with the specific trailer frame and tongue disclosed herein.

A final object of this invention to be specifically enumerated herein is to provide a trailer in accordance with the preceding objects which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the trailer of the instant invention;

FIGURE 2 is an enlarged fragmentary longitudinal vertical sectional view taken substantially upon the plane indicated by section line 2—2 of FIGURE 1;

FIGURE 6 is a horizontal sectional view taken substantially upon the plane indicated by the section line 6—6 of FIGURE 5.

Figure 3:
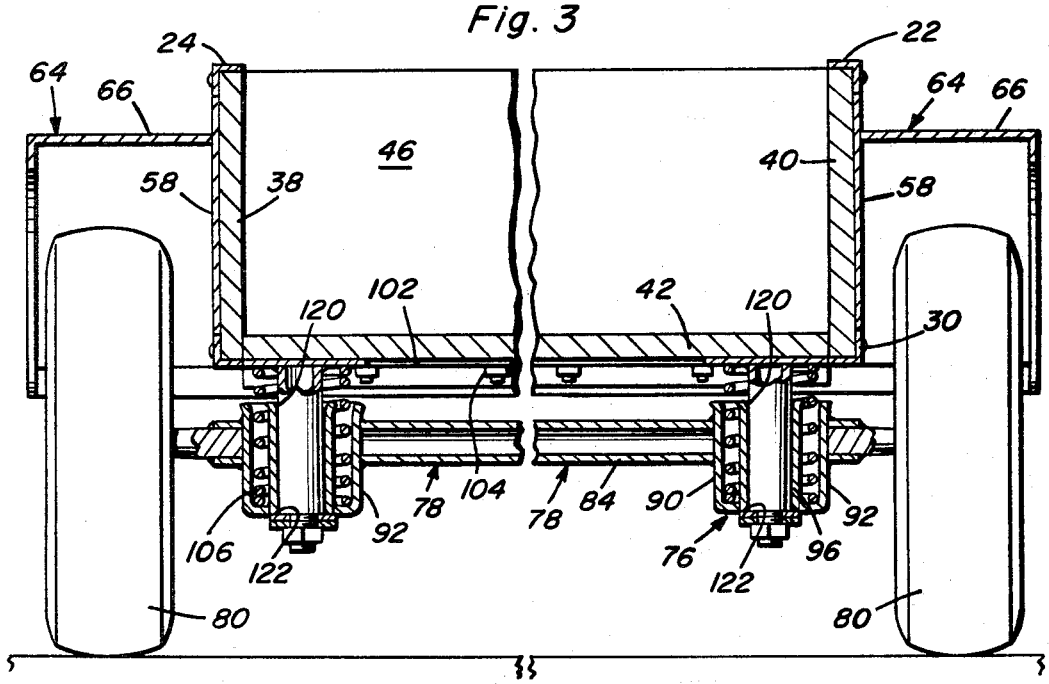
FIGURE 3 is an enlarged fragmentary transverse vertical sectional view taken upon a plane passing through the axle assembly of the trailer.
Figure 4:
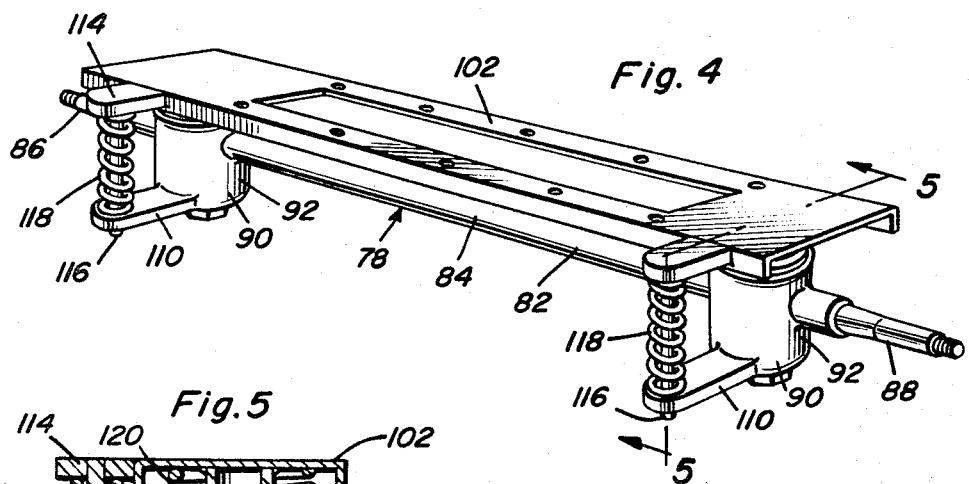
FIGURE 4 is a perspective view of the axle assembly of the trailer.

Referring now more specifically to the drawings the numeral 10 generally designates the trailer of the instant invention which includes a main frame generally referred to by the reference numeral 12 having a body portion referred to in general by the reference numeral 14 and a tongue portion referred to in general by the reference numeral 16.

The frame body portion 14 includes a pair of upper and lower peripheral frame sections 18 and 20. The section 18 includes a pair of longitudinal members 22 and 24 interconnected at their forward ends by means of a transverse member 26 while the frame section 20 includes a pair of longitudinal members 28 and 30 interconnected by means of a forward transverse member 32.

The frame sections 18 and 20 are interconnected by means of front and rear pairs of vertical members 34 and 36 interconnected between the forward ends of the longitudinal members 22 and 24 and the forward ends of the longitudinal members 28 and 30 and between the rear ends of the longitudinal members 24 and 28 and the rear ends of the longitudinal members 22 and 30.

Each of the members 22, 24, 26, 28, 30, 32, 34 and 36 comprises an angle member which is generally L-shaped in cross-section and it may be seen that the opposite sides of the frame body portion 14 are closed by means of side panels 38 and 40 extending between the longitudinal members 24 and 28 and the longitudinal members 22 and 30, respectively. The panels 38 and 40 also extend between and are secured to the corresponding vertical members 34 and 36. Further, a flooring panel 42 is secured between the lower ends of the side panels 38 and 40 and extends the full length of the frame body portion 14 from the forward transverse member 32 of the lower frame section 20 to the rear transverse member 44 of the lower frame section 20 which extends between the rear ends of the longitudinal members 28 and 30.

A hinged tail gate 46 is provided and is pivotally supported from the main frame 12 as at 48 for movement between an upstanding position closing the rear end of the load area bound by the panels 38 and 40 and a depending vertical position rotated approximately 180° from the position thereof illustrated in FIGURE 2 allowing easy access to the rear of the cargo area of the trailer 10.

The tongue portion 16 of the frame 12 includes a forwardly projecting and generally horizontally disposed tow bar 50 secured at its rear end in any convenient manner to the transverse member 32 and provided with a hitch construction 52 at its forward end. In addition, the tongue portion 16 includes four forwardly convergent bracing rods 54 secured at their rear ends to the upper and lower corners of the forward end of the frame body portion 14 and at their forward ends to the tow rod or bar 50 at a point spaced slightly behind the hitch construction 52.

The forward end of the body of the trailer 10 is closed by means of a front panel 56 secured to and extending between the members 26, 32 and 34 and each side of the frame body portion 14 includes a center vertical member 58 secured to and extending between the mid portions of the corresponding longitudinal members of the frame body portion 14. In addition, each side of the frame body portion 14 also includes a pair of upwardly divergent bracing members 60 and 62 whose lower ends are secured to the mid portion of the corresponding lower longitudinal member on opposite sides of the corresponding vertical member 58 and whose upper ends are secured to the corresponding other longitudinal member at points spaced on either side of the upper end of the corresponding vertical member 58.

Each side of the trailer 10 is provided with a fender assembly generally referred to by the reference numeral 64 including a center generally semi-cylindrical portion 66 and a pair of opposite end horizontal sections 68 and 70. The inner edge portions of the horizontal sections 68 and 70 are secured to the confronting portions of the lower longitudinal members and the inner edge portions of the center sections 66 may be secured to the members 58, 60 and 62 in any convenient manner (not shown). Still further, the rear ends of the horizontal sections 70 are provided with inclined brace members 72 secured between their outer edge portions and the rear end of the corresponding upper longitudinal member.

The trailer 10 includes a running gear assembly generally referred to by the reference numeral 76 which includes an axle assembly generally referred to by the reference numeral 78 having ground engaging support wheels 80 rotatably journaled on opposite ends thereof.

The axle assembly 78 includes an axle member 82 having a center section 84 and a pair of opposite end sections 86 and 88 upon which the wheels 80 are rotatably journaled. A pair of spring seat forming socket members 90 including generally cylindrical side walls 92 and centrally apertured bottom walls 94 are secured to the remote ends of the axle member 82 and the inner ends of the end sections 86 and 88 are secured to the remote sides of the socket members 90 in alignment with the center section 84.

Each of the socket members 90 includes an internal upstanding sleeve 96 whose lower end is secured in a corresponding aperture 98 formed in the associated bottom wall 94 and the lower end portion of a sleeve 100 is telescopingly disposed within the upper end of each sleeve 96, the upper ends of the sleeves 100 being fixedly secured to opposite end portions of a downwardly opening and transversely extending channel-shaped mounting plate 102 comprising a part of the running gear assembly 76 and secured to the undersurface of the floor panel 42 with the opposite ends of the mounting plate 102 being disposed in alignment with the lower ends of the vertical members 58. Any suitable fasteners 104 may be utilized to secure the mounting plate 102 to the floor panel 42 and it may be seen from FIGURE 5 of the drawings that a compression spring 106 is disposed about each pair of telescopingly engaged sleeves 96 and 100 with its opposite ends bearing against the upper surface of the corresponding bottom wall 94 and the undersurface portions of the mounting plate 102 disposed above the associated socket member 90.

Secured to the lower end of each sleeve 100 is a diametrically enlarged abutment 108 disposed beneath the bottom wall 94 and thereby limiting movement of each of the socket members 90 away from the mounting plate 102. Still further, each of the socket members 90 includes a laterally outwardly projecting abutment arm 110 suitably apertured as at 112 and the opposite ends of the plate 102 include a corresponding pair of abutment arms 114 from which there is dependingly supported a pair of guide rods 116 whose lower ends are slidably received through the corresponding apertures 112. In addition, a compression spring 118 is disposed between each pair of abutment arms 110 and 114 and encircle the corresponding guide rod 116.

Figure 5:
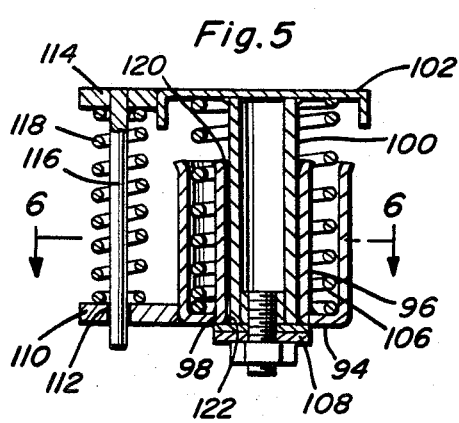
FIGURE 5 is an enlarged vertical sectional view taken substantially upon a plane indicated by section line 5—5 of FIGURE 4.

From FIGURES 3 and 5 of the drawings it may be seen that at least the inner surfaces of each sleeve 96 are flared outwardly at their upper and lower ends as at 120 and 122, respectively. This outward flaring of the upper and lower ends of the sleeves 96 enables the springs 118 to slightly cant or cock the sleeves 96 in a counterclockwise direction relative to the associated sleeves 100 as seen in FIGURE 5 of the drawings without the end edges of sleeves 96 digging into the outer surfaces of the sleeves 100. This canting or cocking of the sleeves 96 serves to perform a binding action of the sleeves 96 on the sleeves 100 during reciprocation of the sleeves 96 relative to the sleeves 100. This binding action acts as a shock absorber resisting movement of the sleeves 96 relative to the sleeves 100.

In actual practice it has been found that this manner of resisting movement of the sleeves 96 relative to the sleeves 100 results in the trailer 10, when either loaded or unloaded, having greater traction on irregular road surfaces through the wheels 80. Accordingly, improved tracking qualities as well as stability result from the binding action of the sleeves 96 with the sleeves 100.

From FIGURE 1 of the drawings it may be seen that the frame tongue portion 16 constitutes an extremely rigid tongue assembly and that any lateral forces applied to the hitch construction 52 will be evenly distributed to the frame body portion 14 and thereby any loads supported within the trailer 10. Further, the sections 68 and 70 of each fender 64 may be utilized to support minimum loads due to the novel configuration of the fenders 64 and the manner in which they are secured to the main frame 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:
1. A two-wheeled trailer comprising a main frame, an axle assembly supported from beneath said main frame, said axle assembly comprising a transverse axle disposed beneath said frame, a pair of axle end anchor members supported from said main frame above opposite end portions of said axle, said opposite end portions having supporting wheels journaled thereon for rotation about generally aligned axes, said opposite end portions and said anchor members including pairs of opposite side coacting telescopingly engaged guide means mounting said end portions for independent movement between upper and lower limit positions toward and away from said frame and disposed in generally the same vertical planes as said axes, said pairs of coacting guide means including means urging said end portions toward their lower limit positions, said opposite end portions and said anchor members including pairs of opposite side upper and lower abutments disposed laterally and to the same side of said planes relative to said telescopingly engaged guide means, and spring means operatively connected between each pair of abutments yieldingly urging each pair of upper and lower abutments away from each other so as to tend to roll the axle about its longitudinal axes and thereby cause said telescopingly engaged guide means to be canted slightly relative to each other and to bind slightly on each other in a shock dampening manner.

2. The combination of claim 1 wherein said coacting guide means are disposed generally in an upstanding plane extending transversely of said axle in which the latter is disposed.

3. The combination of claim 2 wherein said coacting guide means include a pair of tubular members supported from said opposite end portions and rod-like members supported from each of said anchor members and loosely telescoped through the corresponding tubular member, the opposite ends of the inner surface portions of said tubular member being outwardly flared.

4. The combination of claim 1 wherein said frame includes upper and lower perimeter frame sections each including elongated opposite side members interconnected at their forward ends by means of forward elongated transverse members, front and rear pairs of opposite side vertical members interconnected between the front and rear ends of said side members, respectively, a floor assembly interconnecting and extending between the transverse and opposite side members.

5. The combination of claim 4 wherein said trailer includes a forwardly projecting tongue assembly, said tongue assembly including upper and lower pairs of opposite side forwardly convergent bracing bars secured at their rear ends to the forward ends of the upper and lower opposite side members and to each other at their forward ends.

6. The combination of claim 5 wherein said tongue assembly further includes a longitudinal pull bar received at its rear end to said lower transverse member centrally intermediate its opposite ends and to which the forward ends of said bracing bars are secured, the forward end of said pull bar including means adapted to be secured to a towing vehicle.

7. The combination of claim 6 wherein said pull bar and said lower bracing bars are disposed generally in the same horizontal plane.

References Cited

UNITED STATES PATENTS

| | | | |
|---|---|---|---|
| D. 149,806 | 6/1948 | Gaboury | 296—28.22 X |
| 290,860 | 12/1883 | Cole | 167—1 |
| 1,126,912 | 2/1915 | Sturgis | 296—28.22 |
| 1,228,138 | 5/1917 | Rogers | 296—28.22 |
| 1,264,651 | 4/1918 | Hubbard | 296—28.22 X |
| 2,720,413 | 10/1955 | Halverson | 280—414 X |
| 2,876,036 | 3/1959 | Olson | 280—414 X |
| 3,214,047 | 10/1965 | Moye | 280—106 |

FOREIGN PATENTS

| | | |
|---|---|---|
| 785,381 | 10/1957 | Great Britain. |
| 923,397 | 4/1963 | Great Britain. |
| 934,159 | 8/1963 | Great Britain. |

BENJAMIN HERSH, *Primary Examiner.*

C. C. PARSONS, *Assistant Examiner.*